(No Model.)

J. OBART.
Sand Belt.

No. 241,152. Patented May 10, 1881.

WITNESSES
O. J. Lehman.
Jno. Crowell Jr.

INVENTOR
Joseph Obart.
by Liggett and Liggett.
ATTORNEYS

UNITED STATES PATENT OFFICE.

JOSEPH OBART, OF SANDUSKY, OHIO.

SAND-BELT.

SPECIFICATION forming part of Letters Patent No. 241,152, dated May 10, 1881.

Application filed January 5, 1881. (No model.)

*To all whom it may concern:*

Be it known that I, JOSEPH OBART, of Sandusky, in the county of Erie and State of Ohio, have invented certain new and useful Improvements in Sand-Belts; and I do hereby declare the following to be a full, clear, and exact description of the invention, such as will enable others skilled in the art to which it pertains to make and use it, reference being had to the accompanying drawings, which form part of this specification.

My invention relates to sand-belts; and it consists in the manner of attaching two ends of a belt by cutting them at an angle, uniting the ends, and covering the lap with a separate piece of canvas, the whole being securely stitched together.

Figure 1:
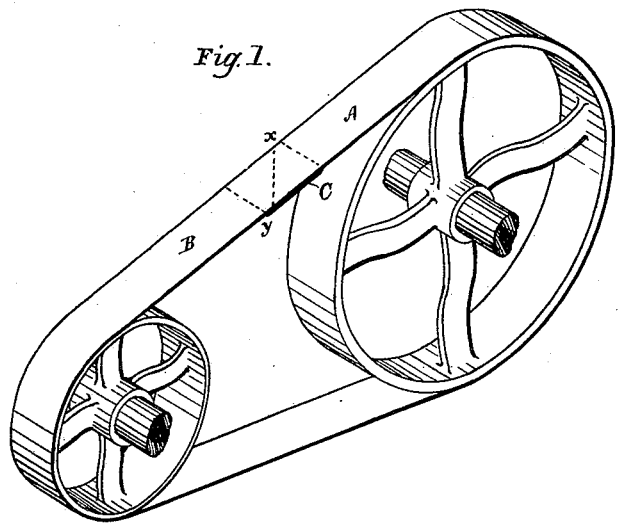
Figure 2:
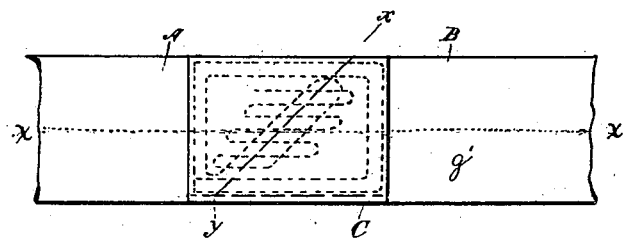
Figure 3:
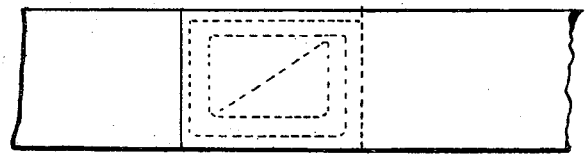

In the drawings, Figure 1 shows a sand-belt constructed according to my invention and attached to pulleys ready for use. Fig. 2 is a plan view of the manner of making the union of the two ends of a belt according to my invention, the broken lines indicating the stitching by which the whole is held together. Fig. 3 is a plan view, showing the old manner of uniting the ends of a sand-belt.

These sand-belts are used of different widths, from two inches upward, and it is customary to use but one-half of the upper surface of the belt in smoothing any round or grooved implement, as ax-helves, &c.

Heretofore these belts have been made by uniting the two ends by simply lapping one over another and stitching them together. They are then covered with glue and sprinkled with sand, when they are ready for use. This leaves in a portion of every belt a rough place where this union is made. To obviate this rough place is the object of my invention.

In belts as formerly constructed but one-half of the upper surface of the belt could be used, as the rough union could be passed when the belt is turning in one direction, but could not be passed when revolving in the opposite direction, as the pressure of the implement upon the belt would tear it apart.

To obviate the difficulties cited I have conceived the manner of uniting the ends of the belt by cutting the ends upon a bias, placing the ends thus cut snugly together, and then upon the under side thereof, over the union, placing a separate piece of canvas, and then stitching both ends to this piece of canvas, thereby making the union perfectly smooth. Belts constructed in this manner can be used upon both sides of their upper surfaces. After one side or half of the upper surface is worn out the belt may be reversed and the other side or half of the upper surface worn out, thereby making a great saving in the use of sand-belts.

I do not, however, limit myself in any degree to sand-belts, as my invention would be equally applicable to all classes of polishing-belts where a smooth surface throughout the entire length of the belt is desired.

In the drawings, A represents one portion of the belt, B the other portion, and C the re-enforced piece to be used, the dotted line $x\,y$ indicating the point of union of the two ends.

In Fig. 2, $x\,x$ is a dotted line dividing the upper surface, A, of the belt into the two sides or halves $g\,g'$. In the operation of the belt the articles to be ground are pressed upon the half or side $g'$ until the sanded surface is worn off, and the belt is then removed from its pulleys and turned one-half way around, thus bringing the other half, $g$, into position for use.

What I claim is—

In a sand-belt, the attaching ends A and B, cut at an angle, united upon a re-enforced piece, C, and the whole stitched together, substantially as set forth.

In testimony whereof I have signed my name to this specification in the presence of two subscribing witnesses.

JOSEPH OBART.

Witnesses:
 JNO. CROWELL, Jr.,
 ALBERT E. LYNCH.